US008046013B1

(12) United States Patent
Zhang et al.

(10) Patent No.: US 8,046,013 B1
(45) Date of Patent: Oct. 25, 2011

(54) OPTIMIZED MMS ARCHITECTURE FOR APPLICATION-TO-PERSON AND PERSON-TO-APPLICATION MESSAGING

(75) Inventors: Shilei Zhang, Walnut Creek, CA (US); Brandie Roberts, Berkeley, CA (US)

(73) Assignee: Cellco Partnership, Basking Ridge, NJ (US)

( * ) Notice: Subject to any disclaimer, the term of this patent is extended or adjusted under 35 U.S.C. 154(b) by 648 days.

(21) Appl. No.: 12/129,385

(22) Filed: May 29, 2008

(51) Int. Cl.
*H04W 4/12* (2009.01)

(52) U.S. Cl. .................. 455/466; 455/556.1; 455/550.1; 370/392

(58) Field of Classification Search .................. None
See application file for complete search history.

(56) References Cited

U.S. PATENT DOCUMENTS

| 2006/0153194 | A1* | 7/2006 | Kim .............................. 370/392 |
| 2008/0043763 | A1 | 2/2008 | Johnson, Jr. et al. |
| 2009/0239544 | A1* | 9/2009 | Myllynen et al. ............. 455/445 |

* cited by examiner

*Primary Examiner* — Phuoc Doan

(74) *Attorney, Agent, or Firm* — McDermott Will & Emery LLP

(57) ABSTRACT

A system provides Multimedia Messaging Service (MMS) to mobile stations through a wireless communication network for person-to-person traffic and traffic to/from an application. The network may include a plurality of Multimedia Messaging Service Centers (MMSCs) coupled to the wireless communication network for MMS communication between two mobile stations, and between a mobile station and an application during call origination mode operations. A second MMSC coupled to the wireless communication network, provides MMS communications between mobile stations and one or more applications during call termination mode operations. In a mobile origination mode operation, the second MMSC concentrates signaling from the first MMSCs and forwards received MMS data, and in a mobile termination mode operations, the second MMSC delivers MMS data to a destination mobile station without forwarding the MMS data to one of the first MMSCs.

16 Claims, 8 Drawing Sheets

FIG. 4 – Prior Art

OPTIMIZED MMS ARCHITECTURE FOR APPLICATION-TO-PERSON AND PERSON-TO-APPLICATION MESSAGING

TECHNICAL FIELD

The present subject matter relates to techniques and equipment to allow Multimedia Message Service (MMS), for example, with improved efficiency when handling MMS communication between a mobile station and applications supported by the MMS architecture.

BACKGROUND

In recent years, cellular and/or personal communication service type mobile devices have emerged as a must-have appliance among mobile professionals and consumers alike, growing in popularity every year since they were first introduced. The public has come to accept that mobile communication service enhances business and personal communications and may contribute to personal security. Consequently, mobile communication is becoming increasingly popular.

Manufacturers have developed wireless devices, such as cellular telephones, with increasing processing power, fast approaching the computing capabilities of devices such as personal computers and personal digital assistants ("PDAs"). Because of this increased processing power, mobile stations actually can be programmed to perform a wide range of application functions, for example, related to tools for productivity enhancement, gaming, entertainment and the like.

Although originally designed and deployed to offer voice-grade telephone services, as the technologies have developed, the mobile stations and the networks that provide service through them have offered an expanding array of data communication services and other related services. For example, a Short Message Service (SMS) application allows users of mobile devices to send and receive text messages; and more recently a MMS application allows users of mobile devices to send and receive multimedia content, such as text, graphics, digital photographs, audio files and video clips, via non-real-time transmission.

SMS is a communications protocol that allows the interchange of short text messages between mobile devices. The SMS technology has facilitated the development and growth of text messaging. SMS as used on modern mobile devices was originally defined as part of the Global System for Mobile communications (GSM) series of standards as a means of sending messages of up to 160 characters, to and from GSM mobile devices. Since then, support for the service has expanded to include alternative mobile standards such as American National Standards Institute (ANSI) Code Division Multiple Access (CDMA) networks and Digital Advanced Mobile Phone System (AMPS), as well as satellite and landline networks. Most SMS messages are mobile-to-mobile text messages, though the standard supports other types of messaging as well.

MMS is a store and forward messaging service/standard that allows mobile devices to send/receive messages that may include any combination of multimedia objects (images, audio, video, rich text, etc). MMS is the evolution of SMS, which is a text-only messaging technology for mobile networks. MMS has been designed to at least work with mobile packet data services such as General Packet Radio Service (GPRS) and 1×/Evolution-Data Only (EVDO).

MMS-enabled mobile devices enable subscribers to compose and send messages with one or more multimedia parts. Multimedia parts may include text, images, audio and video. Furthermore, MMS allows the sending of multiple media parts in a single message, as well as the ability to send a single message to multiple recipients.

An example of how an MMS message can be sent and received between two compatible MMS mobile devices is detailed below. However, it is understood that the network operator may vary the sequence described below.

Using an MMS compatible mobile device, the originating subscriber may create an MMS Message, either using a built-in or accessory camera, or can use images and sounds stored previously in the mobile device (and/or possibly downloaded from a web site or sent in an email). The mobile subscriber may personalize the message by adding text, a sound clip, voice to the image or any combination of the aforementioned applications. The MMS message is subsequently sent to a Multimedia Message Service Center (MMSC) for delivery to another mobile subscriber. If the recipient of the MMS message has an MMS compatible mobile device, then an MMS message will appear on the recipient's mobile device alerting the recipient of a new message. Even if the recipient mobile device is not switched on, the MMS Message will be stored within the operator's network and subsequently sent to the recipient as soon as they switch on their mobile device. In a non-roaming case, the subscriber may even allow an MMS Message to be downloaded automatically to their mobile device and then they would be notified and could see the Multimedia Message immediately. Furthermore, a number of MMS Messages can be stored in the subscriber's mobile device and reviewed or forwarded at a later date. When the MMS message is retrieved from the operator's network, the picture message will open on the screen, text may appear below the image and the audio may begin to play automatically. However, if the MMS message is sent to a non-compatible MMS mobile device, then the user will receive an SMS message possibly stating: "You have been sent a picture message!" The recipient may then be given a website address, and possibly a username/password on which they can view the MMS message.

As demonstrated above, traditional MMS allows subscribers unlimited Person-to-Person (P2P) messaging flexibility that did not exist in conventional SMS deployment scenarios. However, MMS has evolved beyond P2P messaging to become a multimedia entertainment and information delivery channel. Application-To-Person (A2P) and Person-To-Application (P2A) MMS provides content-driven and event-driven alerts, which are normally more time-sensitive than P2P MMS. For example, A2P may include breaking news alerts, alerts in sports, finance, traffic, politics, marketing, promotions, games, ringtone downloads, wallpaper, and off-deck MMS content (anything not offered by a carrier download). As adoption of A2P continues to accelerate, this change will create additional performance and throughput requirements on the network operator's MMS infrastructure.

FIG. 4 is a functional block diagram of an exemplary network 400 for providing MMS services, as well as several terminal devices communicating via the network.

In today's networks, a Mobile Station (MS) can be a cellular phone, personal digital assistant, personal computer or any other wireless communication device adapted to communicate with a wireless carrier network. Typically, a user will carry a mobile station as he or she travels to work, to home, and to other locations. In an operator network that offers MMS services, a user may utilize the mobile station to make voice-based calls to other users, transfer data with other users, check email, connect to the Internet, via the RAN 411 and other network elements not shown.

The RAN 411 also enables MSs 441, 443 and 445 to access the Network 401 over the air via any of the Base Stations (BSs) (BS 413 and 415). For discussion purposes, the drawing shows one such Radio Access Network (RAN) 411, although those skilled in the art will recognize that large carriers operate a number of such networks and that many countries have two or more mobile carriers that offer, or soon will offer, competing wireless/mobile packet data communication services. Through the carrier's access networks, the Overall Network 400 offers mobile communications to customers using mobile stations throughout a wide geographic area.

RAN 411 is a generic portion of the wireless network that may include a number of base stations represented in the example by BS 413 and BS 415, each of which communicates over a number of air-links with one or more of the MS(s) 441, 443 and 445, when the mobile stations are within range. Each base station typically includes several antennae mounted on a radio tower within a coverage area often referred to as a "cell." BS 413 and BS 415 are the part of the RAN that send and receive Radio Frequency (RF) signals to/from the mobile stations that each base station currently serves.

BS 413 and BS 415 assign and reassign channels to the MS(s) 441, 443 and 445 that they serve and monitor the signal levels to recommend hand-offs to other base stations. RAN 411 is connected to Network 401 via a network (not shown) that typically includes a base station controller (not shown) or a radio network controller (not shown) functionality that controls the functions of a number of base stations and helps to manage how calls made by each mobile station are transferred (or "handed-off") from one serving base station to another. Each wireless network equipment vender implements this function differently. Some equipment vendors have a physical entity, which they call a base station controller (not shown), while other vendors include this functionality as part of their switch (not shown).

In FIG. 4, the MS(s) 441, 443 and 445 can connect to any one of the in-range Base Stations (BS(s) 413 and 415) in order to make a call (i.e. voice) or to transfer/receive data. BS 413 and/or BS 415 provide wireless access points to the RAN 411, Network 401 and Internet 425. In FIG. 4, MSs 441 and 443 are connected to BS 413 via the air-link, and MS 445 is connected to BS 415 via the air-link. BS 413 and 415 are connected to Network 401 via other elements of the RAN 411.

Network 401 may include MMSC(s) and Internet Protocol (IP) Network 409. In FIG. 4, Network 401 includes at least MMSC-1 403, MMSC-2 405, MMSC-3 407 connected to each other via IP Network 409. Each of the MMSC-1 403, the MMSC-2 405, and the MMSC-3 407 allow messages to be exchanged between MS(s) 441, 443 and 445 and also other networks. In this current network configuration, the MMSC(s) are designed to support all types of traffic (multi-function)—P2P, person-to-email, P2A and A2P.

Network 401 is also connected to Inter-Carrier (IC) Network 451 and Email Server 441. By maintaining connections to Email Server 441, Mobile Stations connected to Network 401 may send and receive email. Furthermore, Mobile Stations connected to Network 401 may transfer data and voice with users of other operator networks via IC Network 451.

Network 401 is also connected to a Value Added Service Provider 431 (VASP 431) via Internet 425 and Logical Connections 421a, 421b and 421c through the Internet 425 (and typically through IP Network 409). Logical Connection 421a provides a logical connection from MMSC-1 403 to VASP 431. Similarly, Logical Connection 421b provides a logical connection from MMSC-2 405 to VASP 431 and Logical Connection 421c provides a logical connection from MMSC-3 407 to VASP 431.

VASP 431 is an entity that provides web content and/or services to clients, generally network providers as well as end users, without actually performing the role of the network carrier or provider. Furthermore, carriers/network operators can also represent one or more entities that utilize the VASPs in order, e.g., to provide improved content to their subscribers over their network rather than investing the capital to offer such services directly. As a result, VASP 431 receives P2A messaging requests from mobile stations and provides A2P messaging that may include breaking news alerts, alerts in sports, finance, traffic, politics, marketing, promotions, games, ringtone downloads, wallpaper, and off-deck MMS content (anything not offered by a carrier download). Hence, MSs 441, 443 and 445 may exchange data with the VASP 431 via Network 401 to send and receive P2P, A2P and P2A messaging.

In the above network configuration, the MMSC(s) are designed to support all types of traffic (multi-function)—P2P, person-to-email, P2A and A2P. However, unlike P2P traffic, A2P traffic patterns tend to be more "spiky" in busy hours, e.g., sports score alerts that are sent at specific intervals such as at the end of each quarter in a game will cause a large surge of traffic at set intervals. Large surges in network traffic affect system performance and may cause network delays. As a result, the network operator or carrier faces the challenge of how to scale the existing MMSC infrastructure to accommodate new types of traffic patterns. Hence a need exists for an alternative MMS architecture that supports P2P traffic, as well as "spiky" A2P/P2A traffic.

Furthermore, a need exists for reducing the VASP operational management complexity when operator networks are expanded. In FIG. 4, the Network 401 is connected to the VASP 431 via Logical Connections 421a, 421b and 421c. Thus, VASP 431 is individually connected to and communicates with each MMSC in the Network 409. While the number of MMSC(s) in FIG. 4 may not be large, in a practical setting the actual number of MMSC(s) utilized may be larger. Furthermore, although a single VASP is represented in FIG. 4, in a practical setting the actual number of VASPs connected to an operator's network could be quite large. Thus, the greater quantity of MMSC(s) utilized in Network 401 dramatically increases the VASP(s) operational management complexity. Therefore, when hardware or software upgrades are performed to the MMSC(s), the VASP(s) will be informed of each upgrade from each MMSC that each VASP is connected to. Additionally, when new MMSC(s) are added/removed from the Network 401, the VASP(s) will be informed/integrated of these changes through various signaling means. Furthermore, during troubleshooting, by having a number of connections between the MMSC(s) and the VASP(s), the troubleshooting is made more complex. Thus, a further need exists for reducing VASP operational management complexity when operator networks are expanded, managed and upgraded.

SUMMARY

The teachings herein alleviate one or more of the above noted problems with MMS network architectures that support both P2P and A2P/P2A traffic. A communication system is disclosed herein, which incorporates concepts to improve the network architectures that support both P2P and A2P/P2A traffic, for example, a communication system that provides an optimized network for both P2P and A2P/P2A traffic in today's IP networks. This communication system and/or network utilizes an MMSC that is dedicated to MMS traffic from an application and other MMSC(s) that handle client to client traffic between mobile stations.

For example, a system for providing MMS to mobile stations through a wireless communication network, the network might include a plurality of MMSC(s) coupled to the wireless communication network and a second MMSC coupled to the wireless communication network. The plurality of MMSC(s) might provide MMS communication between a first mobile station and a second mobile station, and between mobile stations and one or more applications. The second MMSC might provide MMS communications between mobile stations and one or more applications and the second MMSC is dedicated to application-specific MMS traffic. The second MMSC may be coupled to the first MMSC(s). In a mobile origination mode, the second MMSC may concentrate signaling by receiving MMS data intended for the one or more applications from the mobile stations via the first plurality of MMSC(s), and may forward the received MMS data to the one or more applications. Furthermore, the second MMSC may concentrate signaling by receiving MMS data from the one or more applications, and may forward the received MMS data to the first plurality of MMSC(s). In a mobile termination mode, the second MMSC may receive MMS data from the one or more applications and may deliver the MMS data to a destination mobile station without forwarding the MMS data to one of the first plurality of MMSC(s).

The methodology may be implemented in any type of IP network offering MMS type data services. The methodology supports any application type, both real-time and non real-time applications. In particular, the exemplary methodology is suitable for A2P/P2A MMS data types in today's IP networks.

An advantage provided by the disclosed approach is that "spiky" A2P traffic will be isolated from P2P traffic, thus reducing the impact of network traffic surges at various intervals. The technique also reduces management and scalability issues because the application server, e.g. of the VASP, needs to communicate with a more limited number of MMSC(s).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 5:
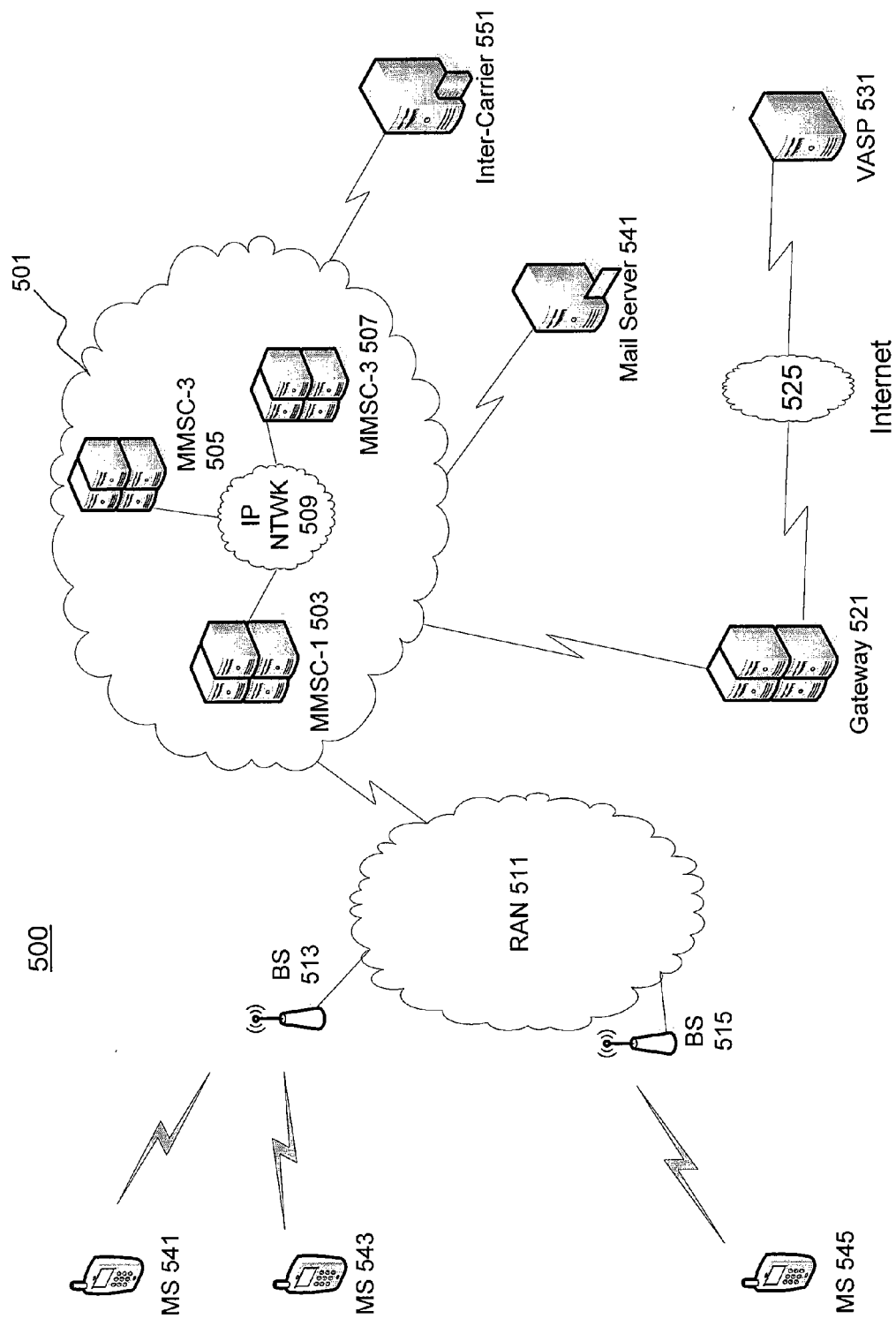
FIG. 5 is an exemplary block diagram of a network architecture that provides MMS services, as well as several terminal devices communicating via the network.

Reference now is made in detail to the examples illustrated in the accompanying drawings and discussed below. As discussed below relative to FIGS. 1-3, a dedicated MMSC for application related traffic improves MMS performance. However, before discussing the network with application traffic through the dedicated MMSC, it may be helpful to first "set the stage" so to speak by considering the configuration of FIG. 5. FIG. 5 is an exemplary block diagram of a network architecture 500 that provides MMS services, as well as several terminal devices communicating via the network.

FIG. 5 illustrates an alternative architecture that the Applicants have considered. While proposals have been made to utilize a gateway device in an MMS architecture, it is not clear how the gateway device is actually implemented and/or how such a device might handle different types of traffic. Thus, Applicants have considered the approach illustrated in FIG. 5 in order to reduce the VASP operational management complexity. As a result, as will be described below, the network shown in FIG. 5 does not require a VASP connection to every MMSC employed. While the addition of a gateway device reduces the number of VASP connections to Network 501 and allows for easier expansion of MMSC(s), the party operating the gateway device inherits the management and routing burdens no longer shouldered by the various VASP(s). Furthermore, the MMSC(s) still handle all types of traffic, e.g., P2P, P2A, A2P, email and inter-carrier network traffic. As a result, due to the "spiky" A2P traffic patterns during busy hours, e.g., sports score alerts that are sent at specific intervals, large surges of traffic still may occur, which results in network delays and latency issues. A solution, which addresses this issue as well, is discussed later with reference to FIGS. 1-3.

As shown in FIG. 5, RAN 511 enables MSs 541, 543 and 545 to access the Network 501 over the air via any of the Base Stations (BS 513 and 515). For discussion purposes, the drawing shows one such RAN 511, although those skilled in the art will recognize that large carriers operate a number of such networks and that many countries have two or more mobile carriers that offer, or soon will offer, competing wireless/mobile packet data communication services. Through the carrier's access networks, the Network Architecture 500 offers mobile communications to customers using mobile stations throughout a wide geographic area.

RAN 511 is a generic portion of the wireless network that may include a number of Base Stations represented in the example by BS 513 and BS 515, each of which communicates over a number of air-links with one or more of the MS(s) 541, 543 and 545, when the mobile stations are within range. Each base station typically includes several antennae mounted on a radio tower within a coverage area often referred to as a "cell." BS 513 and BS 515 are the part of the RAN that send and receive RF signals to/from the mobile stations that each base station currently serves.

BS 513 and BS 515 assign and reassign channels to the MS(s) 541, 543 and 545 that each serves and monitor the signal levels to recommend hand-offs to other base stations. RAN 511 is connected to Network 501 via a network (not shown) that typically includes a base station controller (not shown) or a radio network controller (not shown) functionality that controls the functions of a number of base stations and helps to manage how calls made by each mobile station are transferred (or "handed-off") from one serving base station to another. Each wireless network equipment vender implements this function differently. Some equipment vendors have a physical entity, which they call a base station controller (not shown), while other vendors include this functionality as part of their switch (not shown).

MS 541, 543 and 545 can connect to any one of the in-range Base Stations (BS(s) 513 and 515) in order to make a call (i.e. voice) or to transfer/receive data. BS 513 and/or BS 515 provide wireless access points to the RAN 511, Network 501 and Internet 525. MSs 541 and 543 are connected to BS 513 via the air-link and MS 545 is connected to BS 515 via the air-link. Furthermore, BS 513 and 515 communicate with devices on the Internet 525 via other elements of RAN 511, Network 501 and Gateway 521.

Network 501 includes MMSCs and IP Network 509. MMSCs serve to deliver multimedia messages of text, graphic, video, audio and other media formats to Mobile Stations supported by the operator network and to other Mobile Stations connected to other operators' networks that are connected to the operator's network via Inter-Carrier Network 551. Each MMSC acts as a focal point for multimedia based messages. The MMSC activates the sending flow when it receives a multimedia message sent from a Mobile Station, a VASP, an email server connected to the MMSC or an inter-carrier network connected to the MMSC.

Three MMSC(s) are shown for discussion purposes. It is noted that there may be fewer MMSC(s); but in typical public carrier network deployments, the Network 501 may include a larger number of MMSC(s). MMSC-1 503, MMSC-2 505, MMSC-3 507 are connected to each other via IP Network 509. The IP Network 509 may also provide communications to the RAN(s) 511. MMSC-1 503, MMSC-2 505, MMSC-3 507 allow messages to be exchanged between MSs 541, 543 and 545, mobile stations connected to other operator networks via Inter-Carrier Network 551, Mail Server 541, or VASP 531. However, in this current network configuration, the MMSC(s) are designed to support all types of multi-function traffic: P2P, person-to-email, P2A and A2P.

Network 501 is also connected to IC Network 551 and Email Server 541. By maintaining connections to Email Server 541, mobile stations connected to Network 501 may send and receive email. Furthermore, mobile stations connected to Network 501 may transfer data and voice with users of other operator networks via Inter-Carrier Network 551.

Network 501 is connected to VASP 531 via Gateway 521 and Internet 525. In this architecture, a gateway device 521 has been inserted between the operator network and the VASP in order to indirectly route traffic from the operator network to/from the VASP. Hence, the third party VASP operators need to only communicate through the Internet with the limited number of Gateways employed, as opposed to every MMSC within the operator network. While this exemplary embodiment illustrates Network 501 including only MMSC-1 503, MMSC-2 505, MMSC-3 507, it is understood that Network 501 may be much more complex containing a larger number of MMSCs.

Gateway 521 is connected to VASP 531 via Internet 525. The VASP 531 is an entity that provides web content and/or services to clients, generally network providers as well as end users, without being the network carrier or provider. Furthermore, clients can also represent one or more entities that utilize the VASP in order, e.g., to provide improved content to their subscribers over their network rather than investing the capital to offer such services directly. As a result, VASP 531 provides A2P messaging that may include breaking news alerts, alerts in sports, finance, traffic, politics, marketing, promotions, games, ringtone downloads, wallpaper, and off-deck MMS content (anything not offered by a carrier download). Hence, MSs 541, 543 and 545 may access the VASP 531 via Network 501 to receive A2P messaging.

By employing the Gateway 521, the number of VASP connections to Network 501 may be significantly reduced. Thus, when Network 501 is expanded by adding more MMSCs, or an MMSC upgrade is performed, VASP 531 does not need to be connected to the newly added MMSCs. Instead, Gateway 521 will allow a seamless integration and expansion of Network 501. Thus, the VASP operational management complexity is reduced when operator networks are expanded/upgraded.

However, the Gateway 521 must in turn communicate with all of the MMSC(s). The party operating the Gateway 521 inherits the management and routing burdens no longer shouldered by the various VASP(s) 531. Furthermore, the "spiky" A2P traffic patterns during busy hours, e.g., sports score alerts that are sent at specific intervals, are still present which may result in large surges of traffic. Large surges in network traffic affect system performance and may cause network delays.

Figure 6:
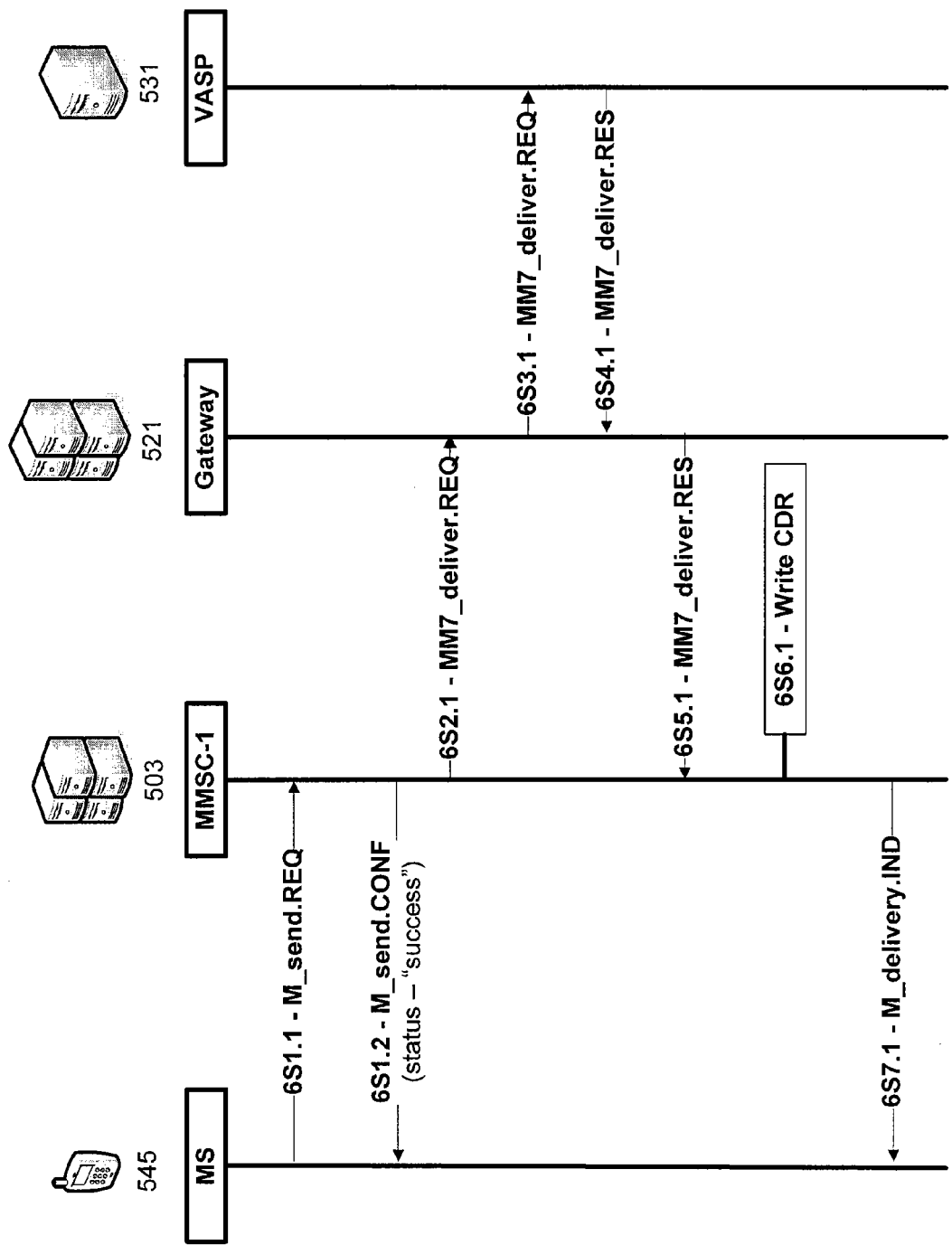
FIG. 6 is a signal flow diagram of an exemplary gateway network in the mobile origination instance.

FIG. 6 is a signal flow diagram depicting an example of a mobile origination call flow of an MMS request by MS 545 and the response(s) from Network 501 and VASP 531. This drawing shows how a send/delivery message can be created/forwarded by an MMSC-1 503, Gateway 521 and VASP 531. The illustrated flows omit some detailed steps that are not necessary to understanding of the concepts under discussion but as a result should make the examples easy to understand and provide more focus on the topics of greatest interest to the reader. The examples are not intended to be exhaustive with respect to all of the different scenarios that may arise in MMS services. Instead, those skilled in the art will recognize that the general examples can readily be adapted to different applications.

Assume for discussion purposes, that a sending mobile station MS 545 sends an MMS message intended for an application located in VASP 531. The MMSC-1 503 responds by delivering the requested MMS message to VASP 531. This message includes multimedia content, such as text, graphics, digital photographs, audio files or video clips, via non-real-time transmission. This is known as a mobile origination call flow.

With reference to the signal flow in the drawings at 6S1.1, an "Msend.REQ" message is sent from MS 545 to MMSC-1 503. The "M_send.REQ" message is received by MMSC-1 503 via BS 515 and RAN 511 (shown in FIG. 5). The "M_send.REQ" message requests servicing of an MMS message-type from a request from the MMSC(s). The "M_send.REQ" MMS message will contain a multimedia content in addition to the sender's address. The "M_send.REQ" signaling message will also include the destination address(es) for the MMS message, so that the MMSC processing the message knows to whom to deliver the MMS message. In this exemplary illustration, the sender's address is of the Mobile Directory Number (MDN) format (e.g., MDN of the sending MS) and the destination address is of the short code format. Short codes, also known as short numbers, are special telephone numbers, significantly shorter than full telephone numbers, which can also be used to address SMS and MMS messages from mobile phones or fixed phones. Short codes are widely used for value-added services such as television voting, ordering ringtones, charity donations and mobile services. Those skilled in the art will recognize that the general examples can readily be adapted to different applications, for example, if an email message was sent then the addressing scheme would conform to the Request For Comment-822 (RFC-822) standard for email messages; if a P2P message is sent, then the addressing scheme would be in a MDN format.

The "M_send.REQ" message sent from MS 545 to MMSC-1 503 utilizes the MM1 interface. MM1 is the standard interface defined by the 3rd Generation Partnership Project (3GPP) utilized for MMS messages between mobile stations and an MMSC. MM1 may be used in the following actions: the sender subscriber sends an MMS to the MMSC, the MMSC notifies the recipient subscriber that he/she has an MMS waiting for retrieval, the recipient subscriber retrieves the MMS from the MMSC, the MMSC notifies a sender MS that the recipient has retrieved the message, the recipient subscriber manages his/her mailbox in the MMSC (uploads MMS, deletes MMS, . . . ), etc.

At 6S1.2, MMSC-1 503 responds to Mobile Station's MMS request by sending a "M_send.CONF" message to MS 545. The "M_send.CONF" message is received by MS 545 via BS 515 (not shown) and RAN 511 (not shown). The "M_send.CONF" message is a confirmation message utilized to confirm receipt of the MMS service request message.

At 6S2.1, MMSC-1 503 forwards the MMS service request to Gateway 521 via use of a "MM7_deliver.REQ" message type. The "MM7_deliver.REQ" message type is an MMS service request message. The MM7 interface is defined by the 3GPP as the standardized interface between MMSCs and VASPs. The MM7 interface is used to send an MMS message to or from 3rd party providers (e.g., a bank sending a statement or an advertiser sending publicity).

At 6S3.1, Gateway 521 forwards the MMS service request to VASP 531 via use of a "MM7_deliver.REQ" message type. The "MM7_deliver.REQ" message type is an MMS service request message. It is noted that Gateway 521 is not concerned with the MMS service request. The primary role of Gateway 521 at this point in the process is to forward the received MMS message from the MMSC(s) to the VASP 531.

At 6S4.1, VASP 531 responds to the MMS service request by sending a "MM7_deliver.RES" message to Gateway 521. The "MM7_deliver.RES" message type is an MMS service response message. VASP 531 may provide web content and/or services to MMSCs as well as Mobile Stations connected to the MMSCs. In this exemplary illustration, VASP 531 provides A2P MMS services if the Network 501 verifies that MS 545 is capable of receiving such services.

At 6S5.1, Gateway 521 forwards the MMS service response to MMSC-1 503 via use of a "MM7_deliver.RES" message type. The "MM7_deliver.RES" message type is an MMS service response message. It is noted that Gateway 521 is not concerned with the MMS service request. The primary role of Gateway 521 at this point in the process is to forward the received MMS message to the MMSC(s) from the VASP 531.

At 6S6.1, the MMSC will verify and/or write the Call Detail Record (CDR). The CDR is a computer record produced by a network containing details of a call or data service that passed through the network, for example, which can be processed for billing purposes. The CDR is retrieved for the Network 501 to bill the user for the services rendered.

At 6S7.1, MMSC-1 503 sends a "M_delivery.IND" message to MS 545. The "M_delivery.IND" message is received by MS 545 via BS 515 and RAN 511 (shown in FIG. 5). The "M_delivery.IND" message serves as a delivery report of the earlier requested MMS services. Thus, the MS 545 is informed of the result of the earlier service request. In this exemplary illustration, the service request by MS 545 is granted and the mobile origination call flow is terminated.

Figure 7:
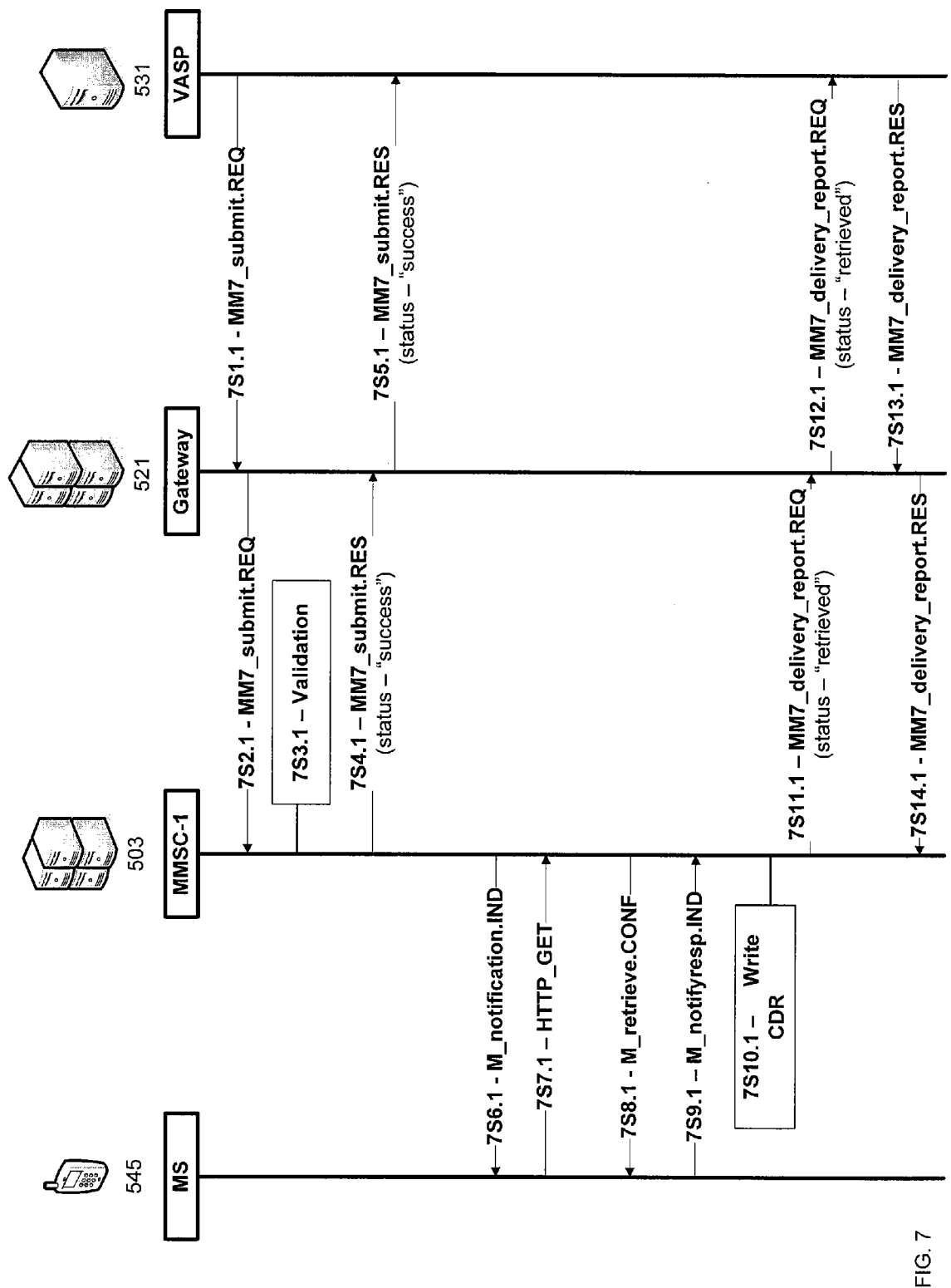
FIG. 7 is a signal flow diagram of an exemplary gateway network in the mobile termination instance.

FIG. 7 is a signal flow diagram depicting an example of a mobile termination call flow of the delivery A2P services from the VASP 531.

This drawing shows how an A2P service results in a series of messages sent between VASP 531, Gateway 521, MMSC-1 503 and MS 545. The illustrated flows omit some detailed steps that are not necessary to understanding of the concepts under discussion but as a result should make the examples easy to understand and provide more focus on the topics of greatest interest to the reader. The examples are not intended to be exhaustive with respect to all of the different scenarios that may arise in MMS services. Instead, those skilled in the art will recognize that the general examples can readily be adapted to different applications.

Assume for discussion purposes, that a VASP 531 sends an A2P MMS message to a destination mobile station MS 545. The Gateway 521 will forward the MMS message to MMSC-1 503. MMSC-1 503 will deliver the MMS message to the destination mobile station MS 545. This message includes multimedia content, such as text, graphics, digital photographs, audio files or video clips, via non-real-time transmission. This is known as a mobile termination call flow.

With reference to the signal flow shown in the drawing, at 7S1.1, an "MM7_submit.REQ" message is sent from VASP 531 to Gateway 521. The "MM7_submit.REQ" message is received by Gateway 521 via Internet 525 (shown in FIG. 5). The "MM7_submit.REQ" message or "Submit Request" message sent from the VASP 531 requests servicing of a submitted MMS message. The "MM7_submit.REQ" MMS message will contain a multimedia content in addition to the sender's address. For example, in this exemplary illustration the multimedia content of the MMS message may contain a video of a highlight from a sporting event. The "MM7_submit.REQ" signaling message will also include the destination address(es) for the MMS message, so that the MMSC processing the message knows to whom to deliver the MMS message. In this exemplary illustration, the sender's address is of the short code format and the destination address is of the MDN format. The short code is associated with the particular VASP 531, whereas the MDN is that of the intended destination, MS 545. However, it is understood that any combination of addresses may be used in order to employ the aforementioned network. The "MM7_submit.REQ" message sent from VASP 531 to Gateway 521 utilizes the MM7 interface.

At 7S2.1, Gateway 521 forwards the "MM7_submit.REQ" or "Submit Request" message to MMSC-1 503. The "MM7_submit.REQ" message sent from VASP 531 to Gateway 521 utilizes the MM7 interface.

At 7S3.1, MMSC-1 503 performs validation. Validation verifies that the destination address of the MMS message is that of a valid subscriber; in other words if the Network 501 should send MMS messages of this sort to MS 545 identified by the MDN in the message. Furthermore, validation verifies that the source of the MMS service request is valid; in other words that the VASP is capable of sending the MMS message. Validation of the source requires that the entity sending the MMS message, in this case, the VASP 531, is registered with the MMSC-1 503. If the VASP 531 is not registered in the MMSC-1 503, then the MMS message sent from the VASP 531 will not be sent to other parts of the network. However, if the Network 501 validates the source and destination addresses, then VASP 531 will provide A2P MMS services to MS 545. Furthermore, in the call termination mode, the MMSC-1 503 acts like any other MMSC in the Network 501.

At 7S4.1, MMSC-1 503 responds to the request by VASP 531 by sending a "MM7_submit.RES" message to VASP 531. The "MM7_submit.RES" message is a "Submit Response" message utilized to confirm receipt of the MMS service request message in S2.1. Furthermore, the submit response message also informs the VASP 531 whether or not the prior MMS message request was accepted or not. If the MMS message was not accepted, the VASP 531 can retry transmission. The "MM7_submit.RES" message sent from MMSC-1 503 to VASP 531 utilizes the MM7 interface.

At 7S5.1, Gateway 521 forwards the "MM7_submit.RES" message to VASP 531. The "MM7_deliver.RES" message is received by VASP 531 via Internet 525 (shown in FIG. 5). The "MM7_submit.RES" message sent from Gateway 521 to VASP 531 utilizes the MM7 interface.

At 7S6.1, MMSC-1 503 sends a "M_notification.IND" message to MS 545. The "M_notification.IND" message is received by MS 545 via BS 515 and RAN 511 (shown in FIG. 5). The "M_notification.IND" message serves as a "notification indicator" that the payload portion of the A2P MMS message is available for retrieval. Furthermore, the "M_notification.IND" message wakes up the MMS application that resides on MS 545. The "M_notification.IND" message sent from MMSC-1 503 to VASP 531 utilizes the MM1 interface.

At 7S7.1, MS 545 sends a "HTTP_GET" message to MMSC-1 503 from which it received notice in step 7S6.1. The "HTTP_GET" message is received by MMSC-1 503 via BS 515 and RAN 511 (shown in FIG. 5). The "HTTP_GET" message requests delivery of the A2P MMS message from the MMSC-1 503. The "HTTP_GET" message utilizes the MM1 interface.

At 7S8.1, MMSC-1 503 sends a "M_retrieve.CONF" message to MS 545. The "M_retrieve.CONF" or "Retrieve Confirmation" message is received by MS 545 via BS 515 and RAN 511 (shown in FIG. 5). The "M_retrieve.CONF" message serves as a delivery message of the payload portion of the A2P MMS message and this provides the content supplied by the VASP 531 to the MS 545. The "M_retrieve.CONF" message utilizes the MM1 interface.

At 7S9.1, MS 545 sends a "M_notifyresp.IND" message to MMSC-1 503. The "M_notifyresp.IND" message is received by MMSC-1 503 via RAN 511 and BS 515 (shown in FIG. 5). The "M_notifyresp.IND" or "Notification Response Indicator" serves as a delivery report of the earlier requested MMS A2P service(s). The "Notification Response Indicator" updates the MMSC-1 503 that it has successfully received the payload portion of the MMS message. Thus, the MMSC-1 503 is informed that the earlier A2P MMS message was retrieved successfully by the MS 545. The "M_notifyresp.IND" message utilizes the MM1 interface.

At 7S10.1, the MMSC(s) will verify and/or write the CDR. The CDR is retrieved and processed for the Network 501 to bill the mobile station (MS 545) for the MMS services rendered.

At 7S11.1, MMSC-1 503 sends a "Delivery Report Request" to the VASP 531 by sending a "MM7_delivery_report.REQ" message to Gateway 521. The "MM7_delivery_report.REQ" message is a delivery report utilized to confirm delivery of the A2P MMS service message. The "Delivery Report Request" message allows the VASP 531 to be updated about the status of the original sent MMS message. Furthermore, the "Delivery Report Request" may allow the network operator to charge premium rates for services; e.g., wallpapers, ringtones, etc. If the MMS message was not delivered for some reason, then VASP 531 can re-send the MMS message. The "MM7_delivery_report.REQ" message utilizes the MM7 interface.

At 7S12.1, Gateway 521 forwards the "MM7_delivery_report.REQ" or "Delivery Report Request). The "MM7_delivery_report.REQ" message is received by VASP 531 via Internet 525 (shown in FIG. 5). The "MM7_delivery_report.REQ" message utilizes the MM7 interface.

At 7S13.1, VASP 531 responds by sending a "MM7_delivery_report.RES" message to Gateway 521. The "MM7_delivery_report.RES" or "Delivery Report Response" message is received by Gateway 521 via Internet 525 (shown in FIG. 5). The "MM7_delivery_report.RES" message is an acknowledgment of the "Delivery Report Request" message of S12.1. If the "Delivery Report Request" message of S12.1 was not received by VASP 531, then Gateway 521 can re-send the "Delivery Report Request" to VASP 531. The "MM7_delivery_report.RES" message utilizes the MM7 interface.

At 7S14.1, Gateway 521 forwards the "MM7_delivery_report.RES" or "Delivery Report Response). The "MM7_delivery_report.RES" message is received by VASP 531 via Internet 525 (shown in FIG. 5). The "MM7_delivery_report.RES" message utilizes the MM7 interface.

However, it understood that this is one example, and that other variations exist. For example, 7S11.1, 7S12.1, 7S13.1 and 7S14.1 are optional steps and are not necessary for proper functionality of Network 500. The "Delivery Report Request" and "Delivery Report Response" messages sent at 7S11.1, 7S12.1, 7S13.1 and 7S14.1 are sent to provide the VASP 531 with a level of reliability.

While the addition of Gateway 521 reduces the number of VASP connections to Network 501 and allows for easier expansion of MMSC(s), the party operating the Gateway 521 inherits the management and routing burdens no longer shouldered by the various VASP(s) 531. Furthermore, the MMSC(s) still handle all types of traffic, e.g., P2P, P2A, A2P, email and inter-carrier network traffic. As a result, due to the "spiky" A2P traffic patterns during busy hours, e.g., sports score alerts that are sent at specific intervals, large surges of traffic still may occur which results in network delays and latency issues. Therefore, Applicants have considered yet another architecture that incorporates some advantages of the Gateway 521 element, but also will be able to handle the "spiky" A2P traffic patterns. Specifically, rather than use a Gateway 521, Applicants have developed an architecture in which one or more MMSC(s) are dedicated to application related traffic, as shown in FIG. 1.

Figure 1A:
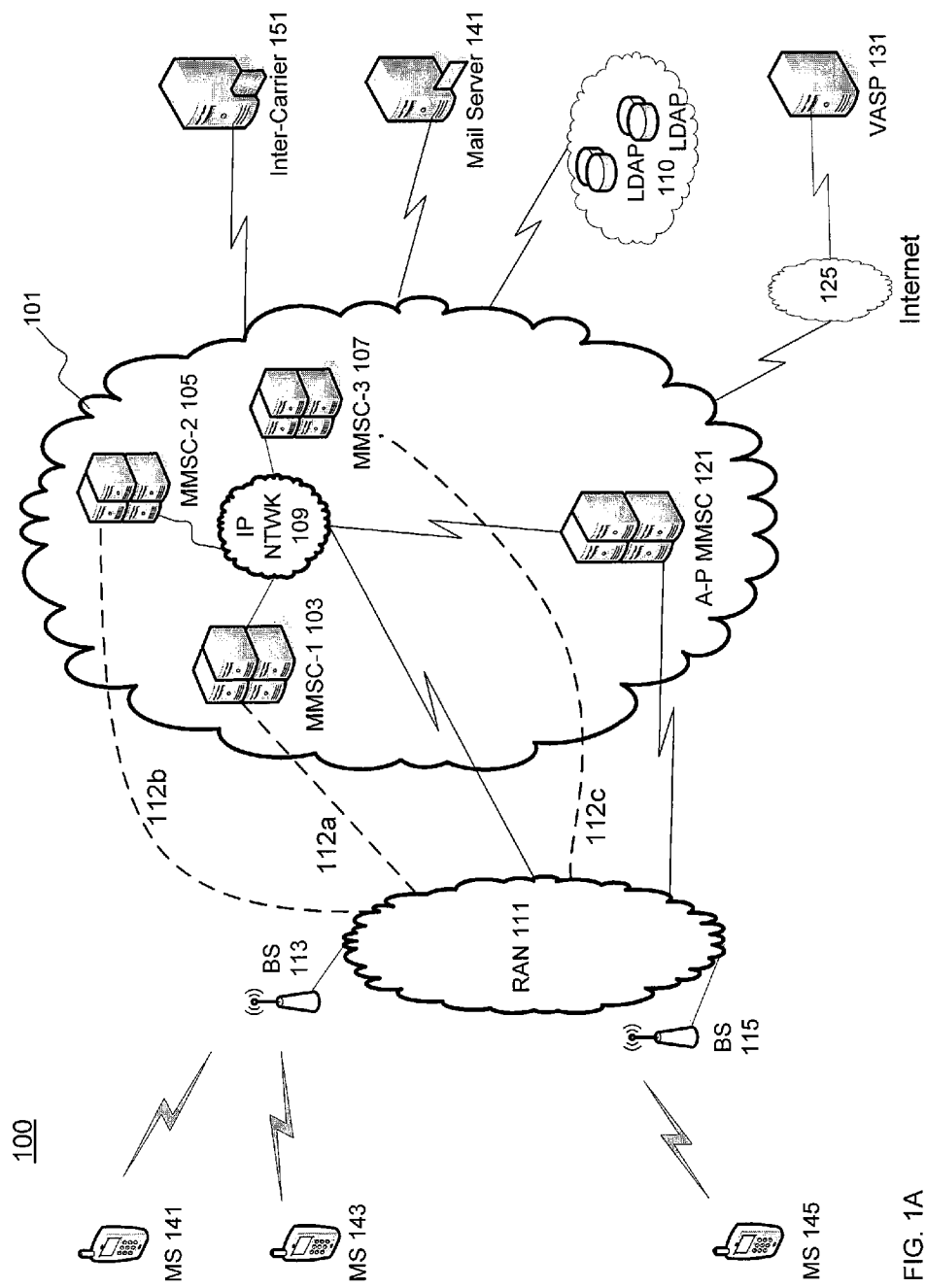
FIG. 1A is an exemplary block diagram of a network architecture of the present disclosure that provides MMS services, as well as several terminal devices communicating via the network.

FIG. 1A is an exemplary block diagram of a network architecture 100 that provides MMS services, as well as several terminal devices communicating via the network.

RAN 111 enables MSs 141, 143 and 145 to access the Network 101 over the air via any of the Base Stations (BS 113 and 115). For discussion purposes, the drawing shows a single RAN 111, although those skilled in the art will recognize that large carriers operate a number of such networks and that many countries have two or more mobile carriers that offer, or soon will offer, competing wireless/mobile packet data communication services. Through the carrier's access networks, the Network Architecture 100 offers mobile communications to customers using mobile stations throughout a wide geographic area.

RAN 111 is a generic portion of the wireless network that may include a number of Base Stations represented in the example by BS 113 and BS 115, each of which communicates over a number of air-links with one or more of the MS(s) 141, 143 and 145, when the mobile stations are within range. Each base station typically includes several antennae mounted on a radio tower within a coverage area often referred to as a "cell." BS 513 and BS 115 are the part of the RAN that send and receive RF signals to/from the mobile stations that each base station currently serves.

BS 113 and BS 115 assign and reassign channels to the MS(s) 141, 143 and 145 that each serves and monitor the signal levels to recommend hand-offs to other base stations. RAN 111 is connected to Network 101 via a network (not shown) that typically includes a base station controller (not shown) or a radio network controller (not shown) functionality that controls the functions of a number of base stations and helps to manage how calls made by each mobile station are transferred (or "handed-off") from one serving base station to another. Each wireless network equipment vender implements this function differently. Some equipment vendors have a physical entity, which they call a base station controller (not shown), while other vendors include this functionality as part of their switch (not shown).

MS(s) 141, 143 and 145 can connect to any one of the in-range Base Stations (BS(s) 113 and 115) in order to make a call (i.e. voice) or to transfer/receive data. BS 113 and/or BS 115 provide wireless access points to the RAN 111, Network 101 and Internet 125. MSs 141 and 143 are connected to BS 113 via the air-link and MS 145 is connected to BS 115 via the air-link. Furthermore, BS 113 and 115 communicate with devices on the Internet 125 via other elements of RAN 111, Network 101 and A-P MMSC 121.

Lightweight Directory Access Protocol (LDAP 110) is connected to Network 101 and Application-Person (A-P) MMSC 121. The Lightweight Directory Access Protocol (LDAP) is an application protocol for querying and modifying directory services running over TCP/IP. A directory is a set of objects with similar attributes organized in a logical and hierarchical manner. In an exemplary illustration, a telephone directory may consist of a series of mobile stations organized alphabetically, with each mobile station having an MDN, short code, email address, service level, etc. Hence, LDAP 110 is utilized by Network 101 and A-P MMSC 121 for authentication of each mobile stations service level. The mobile station data typically enables validation of the mobile station, e.g., whether the mobile station is allowed to send a MMS message or to receive a MMS message, although such data may facilitate MMS service in some other fashion. In an alternative design, a database with subscriber attributes and capabilities may reside directly on an MMSC.

Network 101 includes MMSC(s), IP Network 109 and A-P MMSC 121. The MMSC(s) serve to deliver multimedia messages of text, graphic, video, audio and other media formats to Mobile Stations supported by the operator network and to other Mobile Stations connected to other operators' networks that are connected to the operator's network via Inter-Carrier Network 151. Each MMSC acts as a focal point for multimedia based messages. The MMSC activates the sending flow when it receives a multimedia message sent from a Mobile Station, a VASP, an email server connected to the MMSC or an inter-carrier network connected to the MMSC.

Three MMSC(s) are shown for discussion purposes. It is noted that there may be fewer MMSC(s); but in typical public carrier network deployments, the Network 101 typically may include a large number of MMSC(s). MMSC-1 103, MMSC-2 105, MMSC-3 107 are connected to each other via IP Network 109. MMSC-1 103, MMSC-2 105, MMSC-3 107 allow messages to be exchanged between MSs 141, 143 and 145, mobile stations connected to other operator networks via Inter-Carrier Network 151, Mail Server 141, or VASP 131. However, in this current network configuration, the MMSC(s) are designed to support only certain types of multifunction traffic: P2P, person-to-email and P2A. As will become apparent below, while MMSC-1 103, MMSC-2 105, MMSC-3 107 may handle P2A traffic, MMSC-1 103, MMSC-2 105, MMSC-3 107 do not handle A2P traffic. Furthermore, MMSC-1 103, MMSC-2 105, MMSC-3 107 are connected to the RAN 111 via Logical Connections 112a, 112b and 112c. Logical Connection 112a provides a logical connection from MMSC-1 103 to RAN 111. Similarly, Logical Connection 112b provides a logical connection from MMSC-2 105 to RAN 111 and Logical Connection 112c provides a logical connection from MMSC-3 107 to RAN 111.

Network 101 is also connected to IC Network 151 and Email Server 141. By maintaining connections to Email Server 141, mobile stations connected to Network 101 may send and receive email. Furthermore, mobile stations connected to Network 101 may transfer data and voice with users of other operator networks via Inter-Carrier Network 151.

Network 101 is connected to VASP 131 via A-P MMSC 121 and Internet 125. In this architecture, an AP-MMSC 121 has been inserted between the operator network and the VASP. In a call origination mode, AP-MMSC 121 acts as a "concentrating device" in order to indirectly route traffic from the operator network to the VASP. Hence, the third party VASP operators need to only communicate through the Internet with the limited number of AP-MMSC(s) employed, as opposed to every MMSC within the operator network. However, in a call termination mode, the AP-MMSC 121 has the capability to perform at least most of the operations that the MMSC(s) performs in a call origination mode. Furthermore, in this example the A-P MMSC 121 performs the operations of the MMSC(s). For example, instead of routing traffic from VASP 131 destined for mobile stations connected to RAN 111 to the MMSC(s) (MMSC-1 103, MMSC-2 105 and MMSC-3 107), AP-MMSC 121 directly sends traffic to RAN 111. The exemplary signal flow diagrams in FIGS. 2 and 3 further illustrate these concepts. While this exemplary embodiment illustrates Network 101 including only MMSC-1 103, MMSC-2 105, MMSC-3 107, it is understood that Network 101 may be much more complex containing a larger number of MMSC(s).

A-P MMSC 121 is connected to VASP 131 via Internet 125. The VASP 131 is an entity that provides web content and/or services to clients, generally network providers as well as end users, without being the network carrier or provider. Furthermore, clients can also represent one or more entities that utilize the VASPs in order, e.g., to provide improved content to their subscribers over their network rather than investing the capital to offer such services directly. As a result, VASP 131 provides A2P messaging that may include breaking news alerts, alerts in sports, finance, traffic, politics, marketing, promotions, games, ringtone downloads, wallpaper, and off-deck MMS content (anything not offered by a carrier download). Hence, MS(s) 141, 143 and 145 may access the VASP 131 via Network 101 to receive A2P messaging.

By employing the AP-MMSC 121, the number of VASP connections to Network 101 may be significantly reduced. Thus, when Network 101 is expanded by adding more MMSC(s), or an MMSC upgrade is performed, VASP 131 does not need to be connected to the newly added MMSC(s). Instead, AP-MMSC 121 will allow a seamless integration and expansion of Network 101. Furthermore, in the call termination mode, by allowing the AP-MMSC 121 to directly send traffic to RAN 111, network delays and system overhead are reduced. Thus, VASP operational management complexity is reduced when operator networks are expanded/upgraded.

Figure 1B:
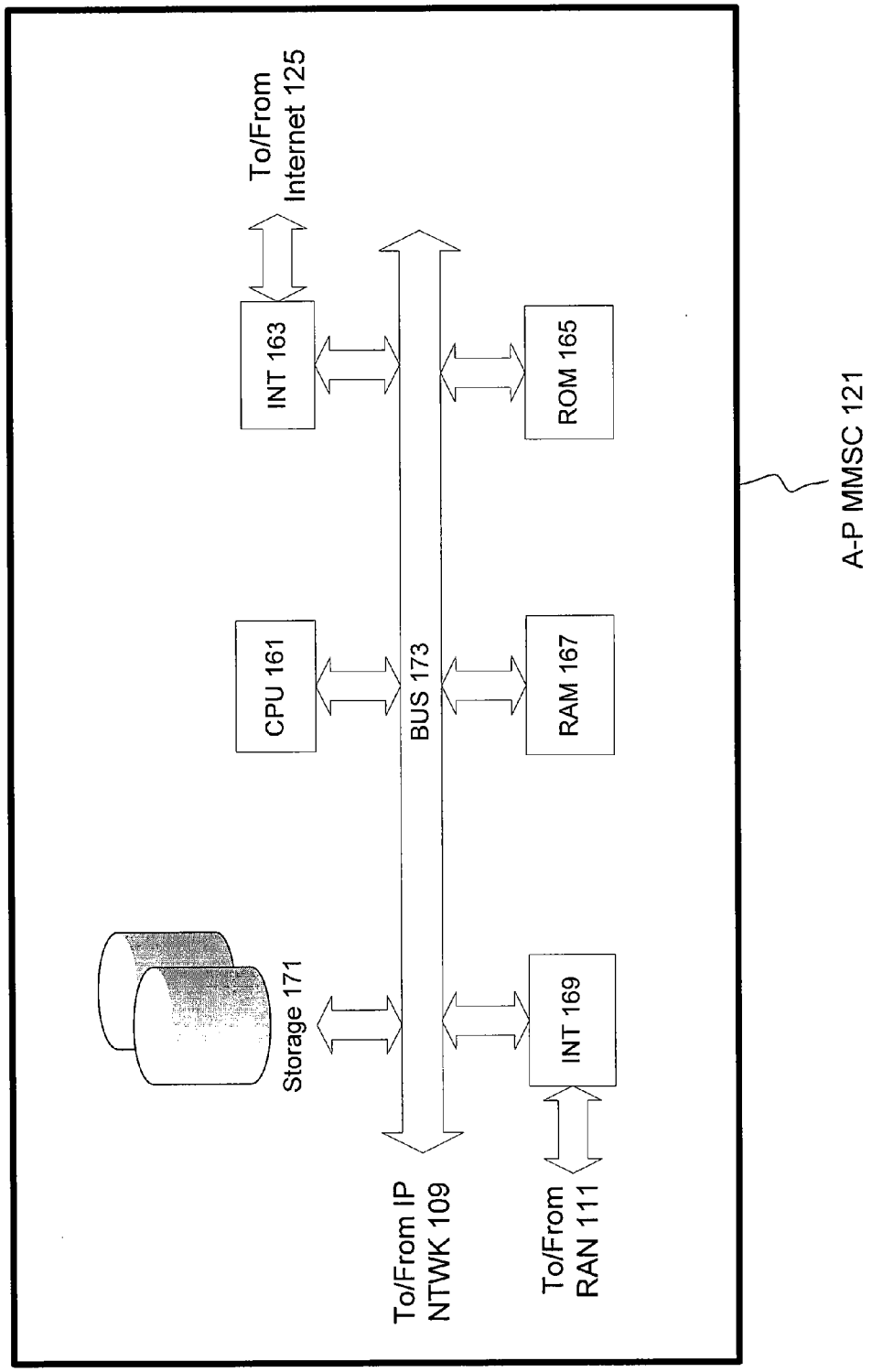
FIG. 1B is an exemplary block diagram of an A-P MMSC of the present disclosure that provides MMS services.

FIG. 1B is an exemplary block diagram of an A-P MMSC of the present disclosure that provides MMS services.

Although special purpose hardware may be used, the example of FIG. 1B assumes the use of a general purpose platform such as that might typically be used as a host or server. The exemplary A-P MMSC 121 thereof includes one or more processors serving as a Central Processing Unit (CPU) 161. The A-P MMSC 121 also has Read-Only Memory (ROM) 165, Random Access Memory (RAM) 167, Interface(s) 163 and 169, BUS 173, and one or more mass Storage devices shown as disk drives at 171.

The BUS 173 provides internal connectivity of the components contained within the A-P MMSC 121. Thus, the CPU 161, Interface(s) 163 and 169, ROM 165, RAM 167, and Storage 171 are connected to each other via the BUS 173. The BUS 173 and Interface 163 provide a logical communication connection to/from the IP NTWK 109 for the A-P MMSC 121. Similarly, the BUS 173 and Interface 163 provide a logical connection to/from the Internet 125 for communications of the A-P MMSC 121. The BUS 173 and Interface 169 provide a logical connection to/from the RAN 111 for communications of the A-P MMSC 121.

The CPU 161 performs the processing operations of any executable code stored in the A-P MMSC 121, e.g., from ROM 165, RAM 167 and/or Storage 171. The Interface (INT) 163 provides an interface to/from the BUS 173 of the A-P MMSC 121 to/from Internet 125. The Interface (INT) 169 provides an interface to/from the BUS 173 of the A-P MMSC 121 to/from RAN 111.

The ROM 165 is a class of storage media utilized in the A-P MMSC 121. While traditional ROM devices contained permanent data, more modern types, e.g. Erasable Programmable Read-Only Memory (EPROM) and flash Electrically Erasable Programmable Read-Only Memory (EEPROM), can be erased and re-programmed multiple times.

The RAM 167 performs data storage to allow the stored data to be accessed in any order, i.e., at random.

The Storage Medium (Storage) 171 provides all other storage capabilities of the A-P MMSC 121. Some programming may reside in Storage 171, before being uploaded to the RAM 167 for execution. In the A-P MMSC 121, Storage 171 also provides the means to store the various multimedia messages going to and/or from mobile stations. For example, the Storage 171 may include a floppy disk, a flexible disk, hard disk, magnetic tape, any other magnetic medium, a (Compact Disc Read-Only Memory) CD-ROM, Digital Versatile Disc (DVD) or Digital Versatile Disc Read-Only Memory (DVD-ROM), any other optical medium, punch cards paper tape, any other physical storage medium with patterns of holes, a RAM, a Programmable Read-Only Memory (PROM) and EPROM, a Flash-EPROM, any other memory chip or cartridge, a transporting data or instructions, cables or links transporting, or any other medium from which a computer can read programming code and/or data.

Figure 2:
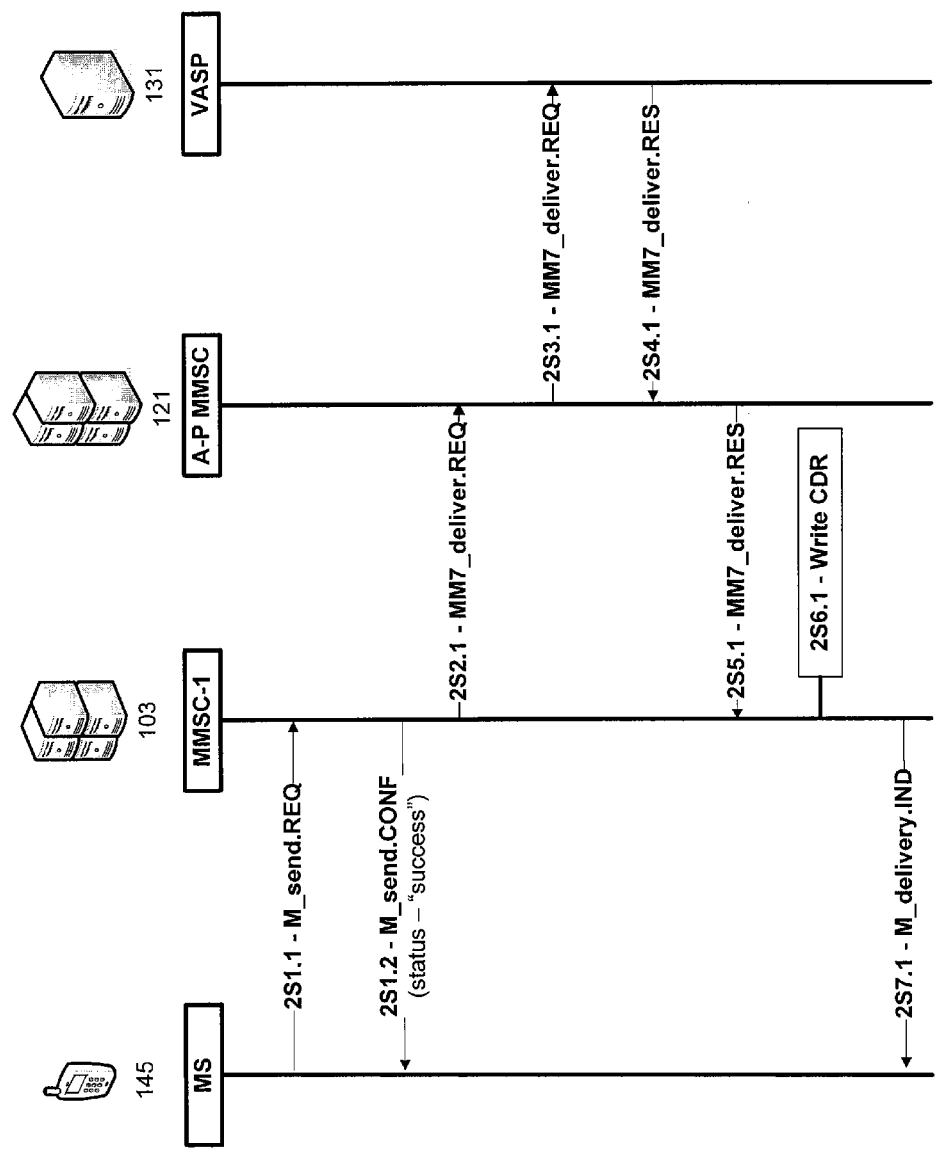
FIG. 2 is a signal flow diagram for MMS communication, in the mobile origination instance.

FIG. 2 is a signal flow diagram depicting an example of a mobile origination call flow of an MMS request by MS 145 and the response(s) from Network 101 and VASP 131. This drawing shows how a send/delivery message can be created/forwarded by an MMSC-1 103, A-P MMSC 121 and VASP 131. The illustrated flows omit some detailed steps that are not necessary to understanding of the concepts under discussion but as a result should make the examples easy to understand and provide more focus on the topic of greatest interest to the reader. The examples are not intended to be exhaustive with respect to all of the different scenarios that may arise in MMS services. Instead, those skilled in the art will recognize that the general examples can readily be adapted to different applications.

Assume for discussion purposes, that a sending mobile station MS 145 sends an MMS message intended for an application located in VASP 131. The MMSC-1 103 responds by delivering the requested MMS message to the VASP 131. This message includes multimedia content, such as text, graphics, digital photographs, audio files or video clips, via non-real-time transmission. This is known as a mobile origination call flow.

With reference to the signal flow in the drawings, at 2S1.1, an "M_send.REQ" message is sent from MS 145 to MMSC-1 103. The "M_send.REQ" message is received by MMSC-1 103 via BS 115 and RAN 111 (shown in FIG. 1). The "M_send.REQ" message requests servicing of an MMS message-type from a request from the MMSC(s). The "M_send.REQ" MMS message will contain a multimedia content in addition to the sender's address. The "M_send.REQ" signaling message will also include the destination address(es) for the MMS message, so that the MMSC processing the message knows to whom to deliver the MMS message. In this exemplary illustration, the sender's address is of the MDN format (e.g., MDN of the sending MS) and the destination address is of the short code format. Those skilled in the art will recognize that the general examples can readily be adapted to different applications, for example, if an email message was sent then the addressing scheme would conform to the RFC-822 standard for email messages; if a P2P message is sent, then the addressing scheme would be in a MDN format. The "M_send.REQ" message sent from MS 145 to MMSC-1 103 utilizes the MM1 interface.

At 2S1.2, MMSC-1 103 responds to Mobile Stations MMS request by sending a "M_send.CONF" message to MS 145. The "M_send.CONF" message is received by MS 145 via BS 115 (not shown) and RAN 111 (not shown). The "M_send.CONF" message is a confirmation message utilized to confirm receipt of the MMS service request message.

At 2S2.1, MMSC-1 103 forwards the MMS service request to A-P MMSC 121 via use of a "MM7_deliver.REQ" message type. The "MM7_deliver.REQ" message type is an MMS service request message. The MM7 interface is used to send an MMS message to or from third party providers.

At 2S3.1, A-P MMSC 121 forwards the MMS service request to VASP 131 via use of a "MM7 deliver.REQ" message type. The "MM7_deliver.REQ" message type is an MMS service request message. It is noted that A-P MMSC 121 is not concerned with the call origination MMS service request. The primary role of A-P MMSC 121 at this point in the call origination process is to forward the received MMS message from the MMSC(s) to the VASP 131.

At 2S4.1, VASP 131 responds to the request by VASP 531 sending a "MM7_deliver.RES" message to A-P MMSC 121. The "MM7_deliver.RES" message is an MMS service response message. VASP 131 may provide web content and/or services to MMSCs as well as Mobile Stations connected to the MMSCs.

At 2S5.1, A-P MMSC 121 forwards the MMS service response to MMSC-1 103 via use of a "MM7_deliver.RES" message type. The "MM7_deliver.RES" message type is an MMS service response message. It is noted that A-P MMSC 121 is not concerned with the call origination MMS service request. The primary role of A-P MMSC 121 at this point in the call origination process is to forward the received MMS message to the MMSC(s) to the VASP 131.

At 2S6.1, the MMSC(s) will verify and/or write the CDR. The CDR is retrieved for the Network 101 to bill the user for the services rendered.

At 2S7.1, MMSC-1 103 sends a "M_delivery.IND" message to MS 145. The "M_delivery.IND" message is received by MS 145 via BS 115 and RAN 111 (shown in FIG. 1). The "M_delivery.IND" message serves as a delivery report of the earlier requested MMS services. Thus, the MS 145 is informed of the result of the earlier service request. In this exemplary illustration, the service request by MS 145 is granted and the mobile origination call flow is terminated. As shown by the discussion of FIG. 2, in the mobile origination case, the messaging flows to the MMSC-1 103, then to A-P MMSC 121 and finally to the VASP 131.

Figure 3:
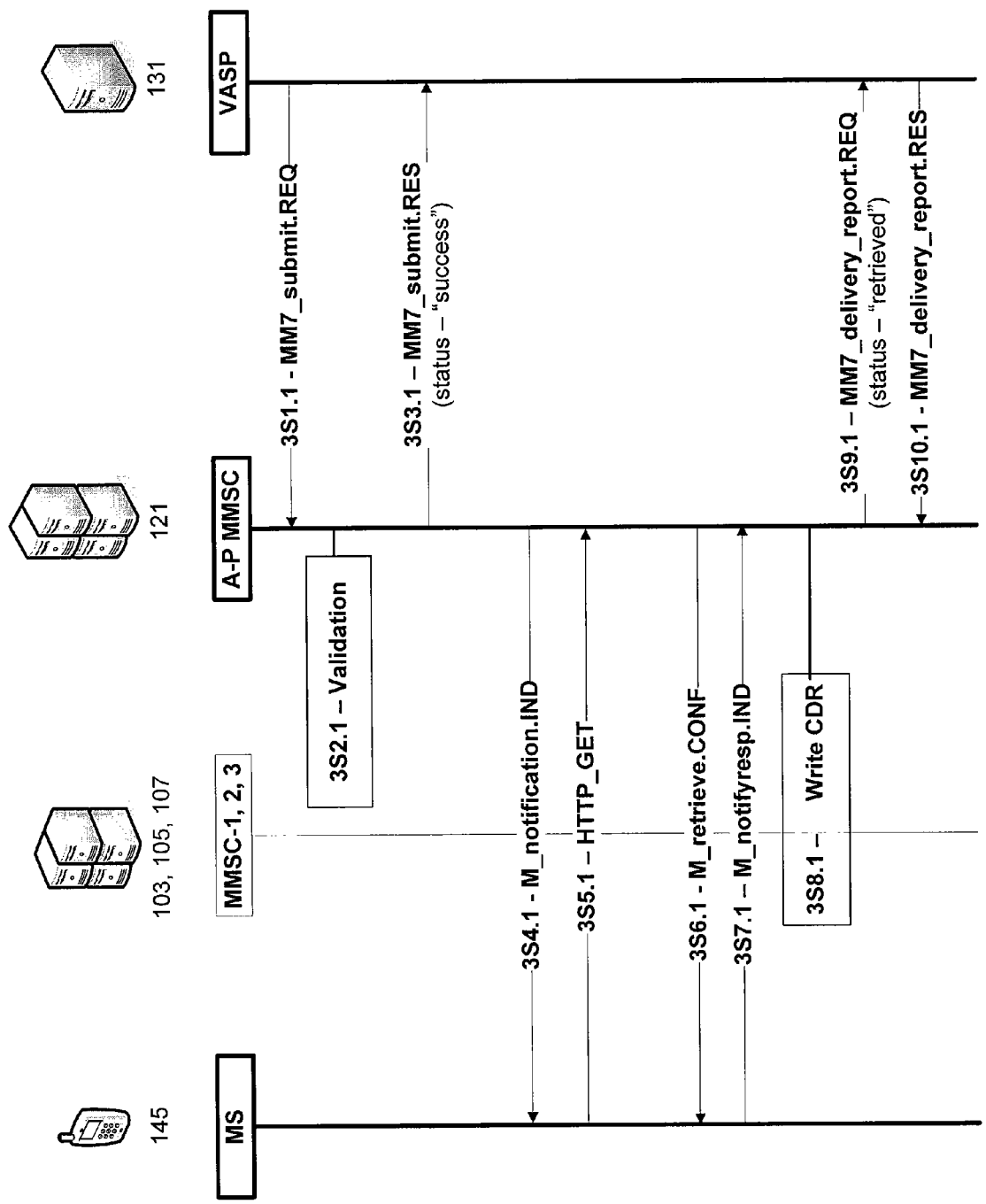
FIG. 3 is a signal flow diagram for MMS communication, in the mobile termination instance.
Figure 4:
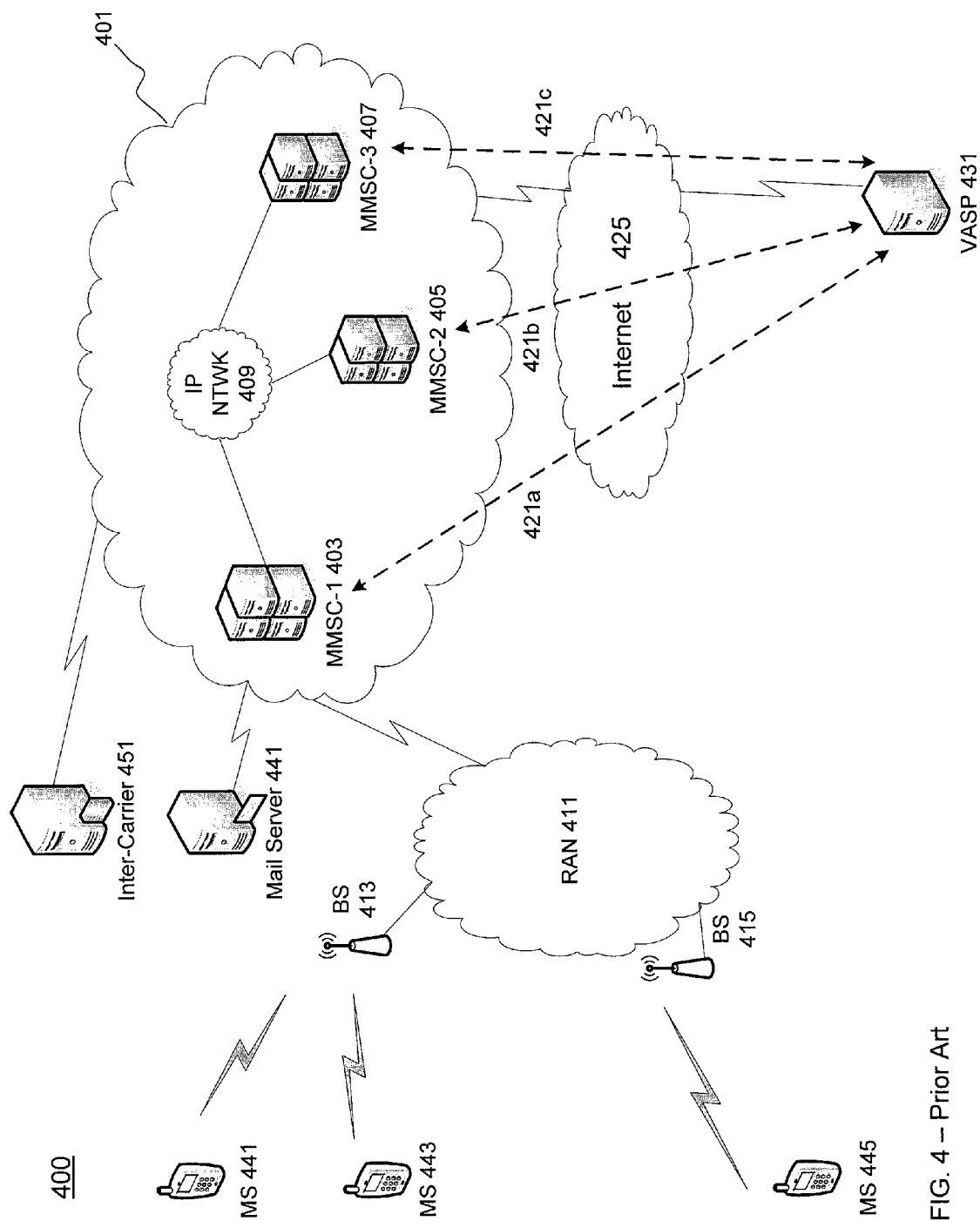
FIG. 4 is an existing block diagram of a network architecture that provides MMS services, as well as several terminal devices communicating via the network.

FIG. 3 is a signal flow diagram depicting an example of a mobile termination call flow of the delivery of A2P services from the VASP 131.

This drawing shows how an A2P service results in a series of messages sent between VASP 131, A-P MMSC 121, MMSC-1 103 and MS 145. The illustrated flows omit some detailed steps that are not necessary to understanding of the concepts under discussion but as a result should make the examples easy to understand and provide more focus on the topics of interest to the reader. The examples are not intended to be exhaustive with respect to all of the different scenarios that may arise in MMS services. Instead, those skilled in the art will recognize that the general examples can readily be adapted to different applications.

Assume for discussion purposes, that VASP 131 sends an MMS message to a destination mobile station MS 145. The A-P MMSC 121 will check the destination mobile station's service level in LDAP 110 (shown in FIG. 1) and if appropriate forward the MMS message to the destination mobile station MS 145. This message includes multimedia content, such as text, graphics, digital photographs, audio files or video clips, via non-real-time transmission. This is known as a mobile termination call flow. Furthermore, as illustrated in the example below, in the mobile termination call flow, A-P MMSC 121 will deliver MMS data to the destination mobile stations (if appropriate) without forwarding data to the MMSC(s). Therefore, in the mobile termination mode, the A-P MMSC 121 bypasses the MMSC(s), and has the capability to perform any of the functions traditionally performed by the MMSC(s).

With reference to the signal flow shown in the drawing, at 3S1.1, an "MM7_submit.REQ" message is sent from VASP 131 to A-P MMSC 121. The "MM7_submit.REQ" message is received by A-P MMSC 121 via Internet 125 (not shown). The "MM7_submit.REQ" message or "Submit Request" message sent from the VASP 131 requests servicing of a submitted MMS message. The "MM7_submit.REQ" MMS message will contain a multimedia content in addition to the sender's address. For example, in this exemplary illustration the multimedia content of the MMS message may contain a video of a highlight from a sporting event. The "MM7_submit.REQ" signaling message will also include the destination address(es) for the MMS message, so that the MMSC processing the message knows to whom to deliver the MMS message. In this exemplary illustration, the sender's address is of the short code format and the destination address is of the MDN format. The short code is that of the particular VASP 131, whereas the MDN is that of the intended destination MS 145. However, it is understood that any combination of addresses may be used in order to employ the aforementioned network. The "MM7_submit.REQ" message sent from VASP 131 to A-P MMSC 121 utilizes the MM7 interface.

At 3S2.1, A-P MMSC 121 validation is performed. Validation verifies that the destination address of the MMS message is that of a valid subscriber; in other words if the Network 101 should send MMS messages of this sort to MS 145 identified by the MDN in the message. Furthermore, validation verifies that the source of the MMS service request is valid; in other words that the VASP is capable of sending the MMS message. Validation of the source requires that the entity sending the MMS message, in this case, the VASP 131, is registered with the A-P MMSC 121. If the VASP 131 is not registered in the A-P MMSC 121, then the MMS message sent from the VASP 131 will not be sent to other parts of the network. However, if the Network 101 validates the source and destination addresses, then VASP 131 will provide A2P MMS services to MS 145. However, it is noted that the A-P MMSC 121 may communicate with the LDAP 110 to obtain relevant data from a subscriber record of the mobile stations. However, in a call termination mode, the AP-MMSC 121 has the capability to perform at least most of the operations that the MMSC(s) performs in a call origination mode. Furthermore, in this example the A-P MMSC 121 performs the operations of the MMSC(s).

At 3S3.1, A-P MMSC 121 responds to the request by VASP 131 by sending a "MM7_submit.RES" message to VASP 131. The "MM7_submit.RES" message is a "Submit Response" message utilized to confirm receipt of the MMS service request message in S1.1. Furthermore, the submit response message also informs the VASP 131 whether or not the prior MMS message request was accepted or not. If the MMS message was not accepted, the VASP 131 can retry transmission. The "MM7_submit.RES" message sent from A-P MMSC 121 to VASP 131 utilizes the MM7 interface.

At 3S4.1, A-P MMSC 121 sends a "M_notification.IND" message to MS 145. The "M_notification.IND" message bypasses MMSC-1 103, MMSC-1 105, and MMSC-3 107 and is delivered to MS 145 via BS 115 and RAN 111 (shown in FIG. 1). The "M_notification.IND" message serves as a "notification indicator" that the payload portion of the A2P MMS message is available for retrieval. Furthermore, the "M_notification.IND" message wakes up the MMS client of the mobile device. The "M_notification.IND" message sent from A-P MMSC 121 to VASP 131 utilizes the MM1 interface.

At 3S5.1, MS 145 sends a "HTTP_GET" message to A-P MMSC 121 from which it received notice in step 3S4.1. The "HTTP_GET" message bypasses MMSC-1 103, MMSC-1 105, and MMSC-3 107 and is delivered to A-P MMSC 121 via BS 115 and RAN 111 (shown in FIG. 1). The "HTTP_GET" message requests delivery of the A2P MMS message from the A-P MMSC 121. The "HTTP_GET" message utilizes the MM1 interface.

At 3S6.1, A-P MMSC 121 sends a "M_retrieve.CONF" message to MS 145. The "M_retrieve.CONF" or "retrieve confirmation" message bypasses MMSC-1 103, MMSC-1 105, and MMSC-3 107 and is delivered to MS 145 via BS 115 and RAN 111 (not shown). The "M_retrieve.CONF" message serves as a delivery message of the payload portion of the A2P MMS message and this provides the content supplied by the VASP 131 to the MS 145. The "M_retrieve.CONF" message utilizes the MM1 interface.

At 3S7.1, MS 145 sends a "M_notifyresp.IND" message to A-P MMSC 121. The "M_notifyresp.IND" message bypasses MMSC-1 103, MMSC-1 105, and MMSC-3 107 and is delivered to A-P MMSC 121 via RAN 111 and BS 115 (shown in FIG. 1). The "M_notifyresp.IND" or "Notification Response Indicator" serves as a delivery report of the earlier requested MMS A2P service(s). The "Notification Response Indicator" updates the A-P MMSC 121 that it has successfully received the payload portion of the MMS message. Thus, the A-P MMSC 121 is informed that the earlier A2P MMS message was retrieved successfully by the MS 145. The "M_notifyresp.IND" message utilizes the MM1 interface.

At 3S8.1, the MMSC(s) will verify and/or write the CDR. The CDR is retrieved and processed for the Network 101 to bill the mobile station (MS 145) for the MMS services rendered.

At 3S9.1, A-P MMSC 121 sends a "Delivery Report Request" to the VASP 131 by sending a "MM7_delivery_report.REQ" message to VASP 131. The "MM7_delivery_report.REQ" message is received by VASP 131 via Internet 125 (shown in FIG. 1). The "MM7_delivery_report.REQ" message is a delivery report utilized to confirm delivery of the A2P MMS service message. The "Delivery Report Request" allows the VASP 131 to be updated about the status of the original sent MMS message. Furthermore, the "Delivery Report Request" message may allow the network operator to charge premium rates for services; e.g., wallpapers, ringtones, etc. If the MMS message was not delivered for some reason, then VASP 131 can re-send the MMS message. The "MM7_delivery_report.REQ" message utilizes the MM7 interface.

At 3S10.1, VASP 131 responds by sending a "MM7_delivery_report.RES" message to A-P MMSC 121. The "MM7_delivery_report.RES" or "Delivery Report Response" message is received by A-P MMSC 121 via Internet 125 (shown in FIG. 1). The "MM7_delivery_report.RES" message is an acknowledgment of the "Delivery Report Request" message of S10.1. If the "Delivery Report Request" message of S10.1 was not received by VASP 131, then A-P MMSC 121 can re-send the "Delivery Report Request" to VASP 131. The "MM7_delivery_report.RES" message utilizes the MM7 interface.

As shown above from the illustrations in FIGS. 2 and 3, while MMSC-1 103, MMSC-2 105, MMSC-3 107 may handle P2A traffic in the call origination mode, MMSC-1 103, MMSC-2 105, MMSC-3 107 do not handle A2P traffic in the call termination mode.

However, it is understood that this is one example, and that other variations exist. For example, 3S9.1 and 3S10.1 are optional steps and are not necessary for proper functionality of Network 100. The "Delivery Report Request" and "Delivery Report Response" messages sent at 3S9.1 and 3S10.1 are sent to provide the VASP 131 with a level of reliability.

Program aspects of the technology may be thought of as "products," typically in the form of executable code and/or associated data that is carried on or embodied in a type of machine readable medium. Media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the MMSC that will be dedicated to MMS application communications. Thus, another type of media that may bear the software elements includes optical, electrical and electromagnetic waves, such as those used across physical interfaces between local devices, through wired and optical landline networks and over various air-links. The physical elements that carry such waves, such as wired or wireless links, optical links or the like, also may be considered as media bearing the software. As used herein, unless restricted to tangible storage media, terms such as computer or machine "readable medium" refer to any medium that participates in providing instructions to a processor for execution.

Hence, a machine readable medium may take many forms, including but not limited to, a tangible storage medium, or physical transmission medium. Non-volatile storage media include, for example, optical or magnetic disks, such as any of the storage devices in any computer(s) or the like, such as may be used to implement the MMSCs, etc. shown in the drawings. Volatile storage media include dynamic memory, such as main memory of such a computer platform. Tangible transmission media include coaxial cables; copper wire and fiber optics, including the wires that comprise a bus within a computer system, or acoustic or light waves such as those generated during radio frequency (RF) and infrared (IR) data communications. Common forms of computer-readable media may therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a Flash-EPROM, any other memory chip or cartridge, a transporting data or instructions, cables or links transporting, or any other medium from which a computer can read programming code and/or data. Many of these forms of computer readable media may be involved in carrying one or more sequences of one or more instructions to a processor for execution.

The concepts discussed above are amenable to a variety of changes and/or adaptations. For example, in the specific examples above, the functions in both the mobile origination mode operations and the mobile termination mode operations were performed in the A-P MMSC. Those skilled in the art will recognize, however, that such processing may be implemented in other network nodes such as a MMSC, a server, a base station controller (if provided separately), etc.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP—3rd Generation Partnership Project
AMPS—Advanced Mobile Phone System
ANSI—American National Standards Institute
A-P—Application-Person
A2P—Application-To-Person
BS—Base Station
CDMA—Code Division Multiple Access
CDR—Call Detail Record
CD-ROM—Compact Disc Read-Only Memory
DVD—Digital Versatile Disc Read-Only Memory
DVD-ROM—Digital Versatile Disc
EPROM—Erasable Programmable Read-Only Memory
EVDO—Evolution-Data Only
GPRS—General Packet Radio Services
GSM—Global System for Mobile Communications
IC—Inter-Carrier
IP—Internet Protocol
IR—Infrared
LDAP—Lightweight Directory Access Protocol
MDN—Mobile Directory Number
MMS—Multimedia Message Service
MMSC—Multimedia Message Service Center
MS—Mobile Station
PDAs—Personal Digital Assistants
PROM—Programmable Read-Only Memory
P2A—Person-to-Application
P2P—Person-to-Person
RAM—Random Access Memory
RAN—Radio Access Network
RFC—Request For Comment
RF—Radio Frequency
SMS—Short Message Service
VASP—Value Added Service Provider

What is claimed is:

1. A system for providing Multimedia Messaging Service (MMS) to mobile stations through a wireless communication network, the network comprising:
    a plurality of first Multimedia Messaging Service Centers (MMSCs) coupled to the wireless communication network, wherein each first MMSC provides MMS communication between a first mobile station and a second mobile station and supports MMS communication between mobile stations and application servers; and
    a second MMSC coupled to the wireless communication network, wherein the second MMSC provides MMS communications between mobile stations and application servers, wherein:
    (a) the second MMSC is coupled to the first MMSCs;
    (b) the second MMSC is dedicated to application-specific MMS traffic;
    (c) in a mobile origination mode, the second MMSC concentrates traffic by:
        receiving MMS messages intended for the application servers from the mobile stations via the first plurality of MMSCs, and forwarding the received MMS messages to the application servers, and
        receiving responsive MMS messages from the application servers, and forwarding the received responsive MMS messages to the first plurality of MMSCs; and
    (d) in a mobile termination mode, the second MMSC receives MMS messages from the application servers and delivers each of the received MMS messages to a destination mobile station without forwarding the received MMS messages to any of the first MMSCs.

2. The system of claim 1, wherein the first MMSCs are coupled to each other via an Internet Protocol (IP) Network and communicate with each other via the IP Network.

3. The system of claim 1, wherein the second MMSC is coupled to the application servers via an Internet connection.

4. A system for providing Multimedia Messaging Service (MMS) to mobile stations through a wireless communication network, the network comprising:
    a plurality of first Multimedia Messaging Service Centers (MMSCs) coupled to the wireless communication network, wherein each first MMSC provides MMS communication between a first mobile station and a second mobile station and supports MMS communication between mobile stations and one or more applications;
    a second MMSC coupled to the wireless communication network, wherein the second MMSC provides MMS communications between mobile stations and one or more applications, wherein:
    (a) the second MMSC is coupled to the first MMSCs;
    (b) the second MMSC is dedicated to application-specific MMS traffic;
    (c) in a mobile origination mode, the second MMSC concentrates traffic by:
        receiving MMS data intended for the one or more applications from the mobile stations via the first plurality of MMSCs, and forwarding the received MMS data to the one or more applications, and
        receiving MMS data from the one or more applications, and forwarding the received MMS data to the first plurality of MMSCs;
    (d) in a mobile termination mode, the second MMSC receives MMS data from the one or more applications and delivers the MMS data to a destination mobile station without forwarding the MMS data to any of the first MMSCs; and
    at least one database containing subscriber records for mobile stations of subscribers to MMS service, wherein the first MMSCs and the second MMSC communicate with the at least one database to obtain relevant data from a subscriber record associated with the mobile stations.

5. The system of claim 4, wherein the communicating with the at least one database uses one or more message communications conforming to Lightweight Directory Access Protocol (LDAP).

6. The system of claim 1, wherein the communicating with the at least one database uses one or more message communications conforming to Lightweight Directory Access Protocol (LDAP).

7. The system of claim 4, wherein the first MMSCs are coupled to each other via an Internet Protocol (IP) Network and communicate with each other via the IP Network.

8. The system of claim 4, wherein the second MMSC is coupled to the one or more applications via an Internet connection.

9. A Multimedia Messaging Service Center (MMSC), wherein the MMSC is dedicated to application-specific traffic, the MMSC comprising:
    an interface for packet communication via a wireless communication network, for Multimedia Messaging Service (MMS) communications with mobile stations served by the wireless communication network;
    an interface for packet communication with application servers;
    a service center processor having message and program storage, coupled to the interfaces,
    wherein execution of a program causes the service center processor to operate the MMSC to provide functions of:

concentrating MMS communications with the application servers, in a mobile origination mode, by:
  receiving MMS messages intended for the application servers from the mobile stations via a plurality of other MMSCs not dedicated to application-specific MMS traffic, and forwarding the received MMS messages to the application servers, and
  receiving responsive MMS messages from the servers, and forwarding the received responsive MMS messages to the other MMSCs; and
receiving MMS messages, in a mobile termination mode, from the application servers and delivering each of the MMS messages to a destination mobile station without forwarding the MMS messages to any of the other MMSCs.

10. The MMSC of claim 9, wherein the MMS communicates with the application servers via an Internet connection.

11. A Multimedia Messaging Service Center (MMSC), wherein the MMSC is dedicated to application-specific traffic, the MMSC comprising:
an interface for packet communication via a wireless communication network, for Multimedia Messaging Service (MMS) communications with mobile stations served by the wireless communication network;
an interface for packet communication with one or more applications;
a service center processor having message and program storage, coupled to the interfaces,
wherein execution of a program causes the service center processor to operate the MMSC to provide functions of:
concentrating MMS communications with the one or more applications, in a mobile origination mode, by:
  receiving MMS data intended for the one or more applications from the mobile stations via a plurality of other MMSCs not dedicated to application-specific MMS traffic, and forwarding the received MMS data to the one or more applications, and
  receiving MMS data from the one or more applications, and forwarding the received MMS data to the other MMSCs; and
receiving MMS data, in a mobile termination mode, from the one or more applications and delivering the MMS data to a destination mobile station without forwarding the MMS data to any of the other MMSCs,
wherein the MMSC communicates with at least one database to obtain relevant data from a subscriber record of the mobile stations, the database containing subscriber records for mobile stations of subscribers to MMS service.

12. The MMSC of claim 11, wherein the communicating with the at least one database uses one or more message communications conforming to Lightweight Directory Access Protocol (LDAP).

13. The MMSC of claim 11, wherein the MMSC is coupled to the one or more applications via an Internet connection.

14. A computer program product, comprising at least one non-transitory machine readable storage medium and executable code transported by the at least one tangible machine readable storage medium, wherein execution of the code by at least one programmable processor of a Multimedia Messaging Service Center (MMSC) dedicated to application-specific MMS traffic in a wireless communication system causes the at least one programmable processor to perform functions in support of providing Multimedia Messaging Service (MMS) communications with mobile stations served by the wireless communication system, the functions comprising:
a function which concentrates MMS communications with application servers, in a mobile origination mode, by:
  receiving MMS messages intended for the application servers from the mobile stations via a plurality of other MMSCs not dedicated to application-specific MMS traffic, and forwarding the received MMS messages to the application servers, and
  receiving responsive MMS messages from application servers, and forwarding the received responsive MMS messages to the plurality of other MMSCs; and
a function which receives MMS messages, in a mobile termination mode, from the application servers and delivers each of the MMS messages to a destination mobile station without forwarding the MMS messages to any of the other MMSCs.

15. A computer program product, comprising at least one non-transitory machine readable storage medium and executable code transported by the at least one tangible machine readable storage medium, wherein execution of the code by at least one programmable processor of a Multimedia Messaging Service Center (MMSC) dedicated to application-specific MMS traffic in a wireless communication system causes the at least one programmable processor to perform functions in support of providing Multimedia Messaging Service MMS communications with mobile stations served by the wireless communication system, the functions comprising:
a function which concentrates MMS communications with the one or more applications, in a mobile origination mode, by:
  receiving MMS data intended for one or more applications from the mobile stations via a plurality of other MMSCs not dedicated to application-specific MMS traffic, and forwarding the received MMS data to the one or more applications, and
  receiving MMS data from the one or more applications, and forwarding the received MMS data to the plurality of other MMSCs;
a function which receives MMS data, in a mobile termination mode, from the one or more applications and delivers the MMS data to a destination mobile station without forwarding the MMS data to any of the other MMSCs; and
a function which communicates with at least one database to obtain relevant data from a subscriber record of the mobile stations, the database containing subscriber records for mobile stations of subscribers to MMS service.

16. The computer program product according to claim 15, wherein the function which communicates with the at least one database uses one or more message communications conforming to Lightweight Directory Access Protocol (LDAP).

* * * * *